Figure 1:
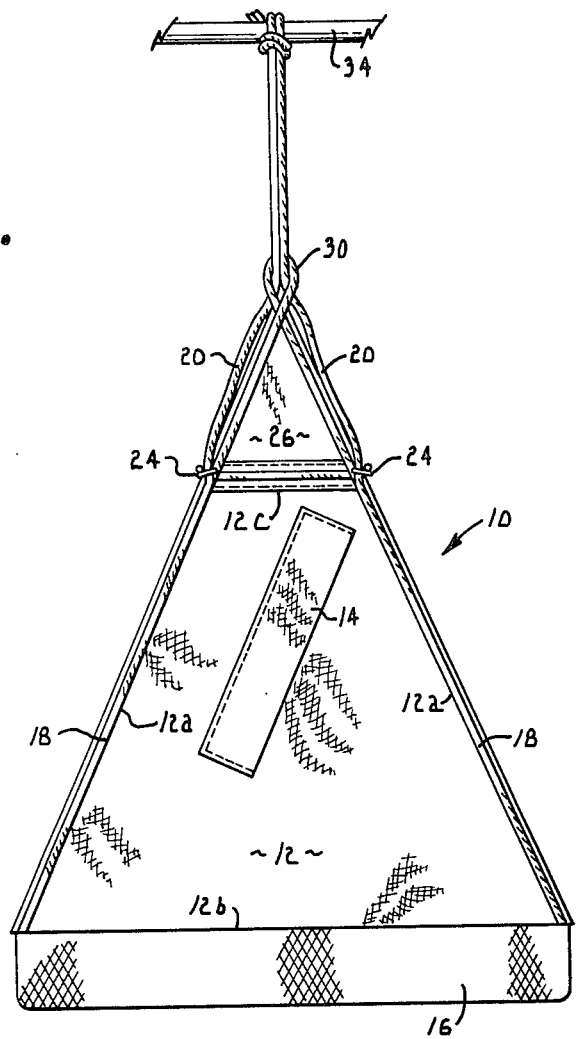

United States Patent [19]

Eshnaur et al.

[11] 4,258,667

[45] Mar. 31, 1981

[54] ANIMAL DUST BAG

[75] Inventors: Helen E. Eshnaur, St. Joseph; Jack I. Shugart, St. Louis, both of Mo.

[73] Assignee: Ralston Purina Company, St. Louis, Mo.

[21] Appl. No.: 82,707

[22] Filed: Oct. 9, 1979

[51] Int. Cl.³ ............................................. A01K 29/00
[52] U.S. Cl. .................................................. 119/159
[58] Field of Search ................................. 119/159, 156

[56] References Cited

U.S. PATENT DOCUMENTS

| | | | |
|---|---|---|---|
| 3,971,342 | 7/1976 | Cortner, Jr. | 119/159 |
| 4,079,700 | 3/1978 | Eshnaur et al. | 119/159 |
| 4,130,092 | 12/1978 | Eshnaur et al. | 119/159 |

*Primary Examiner*—Jay N. Eskovitz
*Attorney, Agent, or Firm*—Lowe, Kokjer, Kircher, Wharton & Bowman

[57] ABSTRACT

The present invention comprises an improved animal dust bag for holding and dispensing powdered insecticide. The bag arrangement permits the bag to be hung from two spaced apart points when it is desired to avoid turning of the bag, or from a single overhead point when turning of the bag is of no concern. A flap extends upwardly from the top of the bag and presents an eyelet for receiving the two tie strings. When the two tie strings are threaded through the eyelet there is virtually no possibility of an animal sticking its head or a horn between the tie strings and pulling down the bag or damaging it. The eyelet also assures that the bag will be held relatively even, thus avoiding compaction of the powdered insecticide in one corner. A horizontal hanger bar extends across the top of the bag and presents two eyelets on either side so that when attachment at two spaced apart points is desired, the two eyelets of the hanger bar will avoid strain being placed on the bag material itself.

5 Claims, 2 Drawing Figures

U.S. Patent  Mar. 31, 1981  4,258,667

ANIMAL DUST BAG

This invention relates generally to animal dust bags and, more particularly, to a dust bag arrangement so as to accommodate hanging of the bag in different ways.

The utilization of powder insecticides for treating cattle has been found to be highly effective. The powder may be applied more efficiently than oil based insecticides and eliminates the handling and pollution problems attendent to oils. The powder is more economical and normally can be applied from a dust bag which requires considerably less space than the "oilers" which have heretofore been used with liquid insecticides.

Various attempts have been made to develop a satisfactory bag for holding a powder insecticide and to also serve as a self-applicator for cattle. Examples of improved forms of bags are shown in U.S. Pat. Nos. 4,079,700 and 4,130,092 which are incorporated herein by reference. The bags shown in the referenced patents have proven effective as self-applicators and efficient waterproof containers, but are designed to be hung from an overhead support by two tie strings or ropes. The two tie method is the preferred form of suspending the bag in a gate area since it is important that the bag be oriented transversely of the gate opening to assure that the cattle will walk into it and the insecticide will be applied.

Some farmers and ranchers prefer not to locate the dust bag in a gate area and instead choose to place it in an open area of the field, often hanging it from a low tree limb. In this situation, it is not as essential that the bag be oriented in one particular direction and, accordingly, it is not as important that the two tie method of suspension be utilized. In this situation, it is even preferred to support the bag from one overhead point because it is easier to tie the bag and take it down.

It is, therefore, a primary object of the present invention to provide a dust bag arrangement for cattle which can be hung from either a single overhead point or from two spaced apart points.

An important aim of the invention is also to provide a dust bag for cattle which can be hung from a single overhead point, but which does not present an open area between the tie means into which cattle could project their heads or horns and thereby tear down the bag or damage it.

It is a further objective of the invention to provide a dust bag for cattle which can be hung from a single tie means, but which incorporates a structure for assuring that the bag will hang evenly so as to avoid compaction of the insecticide in one corner of the bag.

Figure 2:
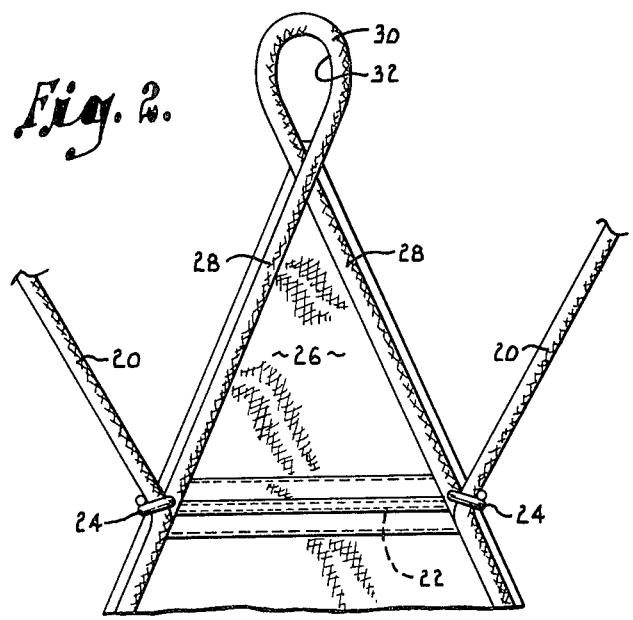

Other objects of the invention will be made clear or become apparent in the following description and claims when read in light of the accompanying drawing wherein:

FIG. 1 is an elevational view of the dust bag according to the present invention; and FIG. 2 is an enlarged fragmentary elevational view of the upper section of the bag which incorporates structure for suspending the bag from either a single point or two points.

Referring initially to FIG. 1 of the drawing, the dust bag arrangement of the present invention is designated generally by the numeral 10. Dust bag 10 comprises a generally triangular shape bag member 12 having sides 12a, a bottom 12b and a top designated 12c. The bag is also characterized by a pocket 14 which presents an opening into the interior of the bag and a chamber 16 along the bottom for dispensing powder insecticide.

It is to be understood that the bag member 12 is normally constructed of an outer waterproof material such as canvass and an inner loosely woven material such as burlap. The sides of bag member 12 are sewn together and also have sewn thereto a reinforcing binding 18. An extension of binding 18 projects upwardly from the top of the bag to present two opposed tie strings 20 for supporting the bag from an overhead position.

Also coupled with bag member 12 at the top thereof is an elongated hanger bar 22 which extends the length of top 12c and projects outwardly on either side of the bag member to present eyelets 24 through which tie strings 20 are threaded.

Also coupled with the top of the bag member is a generally triangularly configured flap 26. The sides of flap 26 are provided with a reinforcing binding 28 which is sewn to the flap and merges into binding 18. Reinforcing binding 28 extends in a continuous loop 30 above the upper most point of flap 26 to present a third eyelet 32 for receiving the tie strings 20.

In use, when dust bag 12 is to be positioned at a gate opening, tie strings 20 will be spread apart in the manner illustrated in FIG. 2 and each tie string will be tied to an overhead support at a location spaced apart from the other tie string. This assures that the bag member 12 will remain transverse to the path of travel of the cattle moving through the gate thereby achieving maximum application of the insecticide within the bag.

When the bag is to be placed in an open field and it is desired to use a single overhead point of attachment, such as illustrated in FIG. 1, tie strings 20 are threaded through eyelet 32 as illustrated in this Fig. In this arrangement, it is to be noted that flap 26 substantially occupies the entire area between the tie strings 20 and the top of bag member 12c. This precludes an animal from sticking its head or a horn in this area and either tearing down the bag or damaging it. The two tie strings 20 are releasably retained in side by side relationship as they pass through loop 30 and then may be secured to an overhead support such as 34 at a single point of attachment as indicated. Loop 30 also serves to assure that the two tie strings 20 will be approximately even thus avoiding a hanging position which would cause the powdered insecticide to compact in one corner of the bag.

All of the objectives of the invention are therefore achieved and a substantial improvement in dust bags is presented by the present invention.

We claim:

1. A dust bag arrangement for applying powdered insecticide to animals and adapted to receive a container for said insecticide, said arrangement comprising:
   a bag member having a bottom, sides and a top and adapted to receive said container;
   tie means coupled with said member at opposite sides of the latter and extending upwardly from said top for securing said member from an overhead support;
   means for releasably holding said tie means together at a point intermediate the point of coupling with said member and the ends of the tie means removed from said bag member; and
   flap means coupled with said bag member and said releasable holding means and substantially covering the area defined by the top of said member and said tie means when the latter are held by said releasable holding means.

2. The arrangement as set forth in claim 1, wherein is included hanger means extending across the top of said bag member and coupled with the latter, said hanger means presenting eyelets for receiving said tie means at each of said opposite sides.

3. The arrangement as set forth in claim 1 wherein is included a reinforcing binding extending along opposite sides of said flap, said binding extending above said flap to present said releasable holding means.

4. The arrangement as set forth in claim 3, wherein is included a reinforcing binding extending along said opposite sides of said member.

5. The arrangement as set forth in claim 4, wherein said tie means is integral with and comprises an extension of that portion of said reinforcing binding extending along the sides of said member.

* * * * *